United States Patent
Ogiso et al.

(10) Patent No.: US 8,485,167 B2
(45) Date of Patent: Jul. 16, 2013

(54) ABNORMALITY DETECTION APPARATUS AND ABNORMALITY DETECTION METHOD FOR AIR/FUEL RATIO SENSOR

(75) Inventors: Takeo Ogiso, Toyota (JP); Hiroaki Tsuji, Miyoshi (JP); Yuya Yoshikawa, Chiryu (JP); Keiko Okamoto, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 713 days.

(21) Appl. No.: 12/785,816

(22) Filed: May 24, 2010

(65) Prior Publication Data
US 2010/0324802 A1     Dec. 23, 2010

(30) Foreign Application Priority Data
Jun. 18, 2009 (JP) ................. 2009-145543

(51) Int. Cl.
*F02D 41/00* (2006.01)
(52) U.S. Cl.
USPC .............................. 123/690; 701/109; 701/114
(58) Field of Classification Search
USPC .................. 123/688, 690; 701/102, 103, 107, 701/109, 114
See application file for complete search history.

(56) References Cited

U.S. PATENT DOCUMENTS

| | | | |
|---|---|---|---|
| 6,032,659 A * | 3/2000 | Yamashita et al. | 123/674 |
| 7,248,960 B2 * | 7/2007 | Ikemoto et al. | 701/114 |
| 7,720,595 B2 * | 5/2010 | Iwazaki | 701/114 |
| 7,725,247 B2 * | 5/2010 | Iwazaki | 701/114 |
| 7,751,966 B2 * | 7/2010 | Iwazaki | 701/114 |
| 7,885,757 B2 * | 2/2011 | Yamaguchi | 701/109 |
| 8,050,852 B2 * | 11/2011 | Kato | 701/115 |

FOREIGN PATENT DOCUMENTS

| | | |
|---|---|---|
| JP | A-11-107830 | 4/1999 |
| JP | A-2001-242126 | 9/2001 |
| JP | A-2002-285904 | 10/2002 |
| JP | A-2004-225684 | 8/2004 |
| JP | A-2004-308574 | 11/2004 |
| JP | A-2005-325788 | 11/2005 |
| JP | A-2007-9797 | 1/2007 |
| JP | A-2007-24581 | 2/2007 |

* cited by examiner

*Primary Examiner* — Thomas Moulis
(74) *Attorney, Agent, or Firm* — Oliff & Berridge, PLC (57) ABSTRACT

An abnormality detection apparatus includes: an air/fuel ratio control portion that performs a control of fluctuating the air/fuel ratio between rich and lean states; a data acquisition portion that acquires, as data for detecting abnormality, a parameter that corresponds to responsiveness during change of output of the A/F sensor between rich and lean peaks during the control; a straight line setting portion that sets a straight line that represents a tendency of change of the parameter relative to change in intake air amount of the engine based on the data acquired by performing acquisition of the data a plurality of times; and an abnormality determination portion that determines the presence/absence of abnormality of the A/F sensor based on comparison between the gradient of the set straight line and an abnormality criterion value.

6 Claims, 8 Drawing Sheets

ABNORMALITY DETECTION APPARATUS AND ABNORMALITY DETECTION METHOD FOR AIR/FUEL RATIO SENSOR

INCORPORATION BY REFERENCE

The disclosure of Japanese Patent Application No. 2009-145543 filed on Jun. 18, 2009 including the specification, drawings and abstract is incorporated herein by reference in its entirety.

BACKGROUND OF THE INVENTION

1. Field of the Invention

The invention relates to an abnormality detection apparatus and an abnormality detection method for an air/fuel ratio sensor.

2. Description of the Related Art

An internal combustion engine for a motor vehicle or the like is provided with an air/fuel ratio sensor that outputs a signal that corresponds to the air/fuel ratio of the internal combustion engine on the basis of the oxygen concentration in exhaust gas. On the basis of the output from the air/fuel ratio sensor, the amount of fuel injected into the engine is corrected to so that the air/fuel ratio of the engine becomes equal to a stoichiometric air/fuel ratio. By controlling the air/fuel ratio of the internal combustion engine to the stoichiometric air/fuel ratio through the correction of the amount of fuel injection, good performance of exhaust purification of an exhaust purification catalyst provided in an exhaust system of the engine is maintained so that the exhaust emission of the internal combustion engine can be bettered.

With the foregoing internal combustion engine, there is a risk that abnormality of the air/fuel ratio sensor, such as degradation thereof or the like, may influence the exhaust emission. Therefore, in order to prevent such influence, the engine is provided with an abnormality detection apparatus that determines the presence/absence of abnormality of the air/fuel ratio sensor. A known abnormality detection apparatus for an air/fuel ratio sensor determines the presence/absence of abnormality of the air/fuel ratio sensor by the following procedure "1" to "3" as shown in, for example, Japanese Patent Application Publication No. 2004-225684 (JP-A-2004-225684). Firstly, as the process "1" in the procedure, an active air/fuel ratio control in which the air/fuel ratio of the internal combustion engine is periodically fluctuated between a rich state and a lean state is performed. Next, as the process "2", a parameter that corresponds to the responsiveness of the output of the air/fuel ratio sensor is found on the basis of the output of the sensor during the active air/fuel ratio control, and the parameter is acquired as data for detecting abnormality. Finally, as the process "3", the presence/absence of abnormality of the air/fuel ratio sensor is determined on the basis of comparison between the acquired data and an abnormality criterion value.

By the way, in recent years, the requirement for betterment of exhaust emission of the internal combustion engine has become severer. Therefore, it is considered that in order to determine that an air/fuel ratio sensor that does not meet the requirement is abnormal, the abnormality criterion value used in the process "3" is shifted toward the side of normality and therefore the determination as to the presence/absence of abnormality of the air/fuel ratio sensor is performed more severely so that it is more likely to be determined that the air/fuel ratio sensor has abnormality.

However, if in the process "3", the foregoing determination as to the presence/absence of abnormality is made severer so that it is more likely to be determined that the air/fuel ratio sensor has abnormality, the difference between the output of the air/fuel ratio sensor during normality thereof and the output of the air/fuel ratio sensor during abnormality thereof becomes small, so that the responsiveness parameter found in the process "2" less clearly represents a difference made by the presence/absence of abnormality of the air/fuel ratio sensor. In particular, during the state of small amount of intake air of the internal combustion engine, since the exhaust gas pressure of the internal combustion engine (that corresponds to the amount of flow of exhaust gas) becomes low so that the influence caused by abnormality of the air/fuel ratio sensor, such as degradation thereof or the like, does not clearly appear in the output of the air/fuel ratio sensor, the foregoing tendency of the responsiveness parameter representing less clearly the difference made by the presence/absence of abnormality of the air/fuel ratio sensor becomes conspicuous. Furthermore, when the motor vehicle is accelerating or decelerating during the small-amount-of-intake-air state of the internal combustion engine, the responsiveness parameter greatly fluctuates due to the response delay of various appliances of the internal combustion engine, so that there is high possibility that data acquired in the process "2" will have a value that makes it hard to determine the presence/absence of abnormality of the air/fuel ratio sensor.

If the responsiveness parameter found in the process "2" less clearly represents a difference between the presence and the absence of abnormality of the air/fuel ratio sensor, it becomes difficult to accurately determine the presence/absence of abnormality of the air/fuel ratio sensor in the process "3".

SUMMARY OF THE INVENTION

The invention provides an abnormality detection apparatus and an abnormality detection method for an air/fuel ratio sensor which are capable of accurately determine the presence/absence of abnormality of the air/fuel, ratio sensor even if setting is made such that it is more likely to be determined that the air/fuel ratio sensor has abnormality.

An abnormality detection apparatus for an air/fuel ratio sensor in accordance with a first aspect of the invention is an abnormality detection apparatus for an air/fuel ratio sensor that outputs a signal that corresponds to air/fuel ratio of an internal combustion engine based on oxygen concentration in exhaust gas of the internal combustion engine, the apparatus including: an air/fuel ratio control portion that performs an active air/fuel ratio control of periodically fluctuating the air/fuel ratio of the internal combustion engine between a rich state and a lean state; a data acquisition portion that acquires, as data for detecting abnormality, a parameter that corresponds to responsiveness during change of output of the air/fuel ratio sensor between a rich peak and a lean peak during the active air/fuel ratio control performed by the air/fuel ratio control portion; a straight line setting portion that sets a straight line that represents a tendency of change of the parameter relative to change in intake air amount of the internal combustion engine based on the data acquired by the data acquisition portion a plurality of times; and an abnormality determination portion that determines presence/absence of abnormality of the air/fuel ratio sensor based on comparison between an abnormality criterion value and a gradient of the straight line set by the straight line setting portion.

According to the abnormality detection apparatus for the air/fuel ratio sensor in accordance with the first aspect of the invention, the presence/absence of abnormality of the air/fuel ratio sensor is determined in the following procedure. That is, the active air/fuel ratio control is performed. When the output of the air/fuel ratio changes between the rich peak and the lean peak during the active air/fuel ratio control, a parameter that corresponds to the response of the change of the output of the sensor is found on the basis of the output, and is acquired as data for use for detecting abnormality. Then, the straight line that represents the tendency of change of the parameter relative to change in the intake air amount of the internal combustion engine (hereinafter, referred to as "responsiveness parameter") is determined, and the presence/absence of abnormality of the air/fuel ratio sensor is determined on the basis of comparison between the gradient of the straight line and the abnormality criterion value.

The responsiveness parameter changes toward a value that shows good responsiveness in association with increase in the intake air amount of the internal combustion engine, both when the air/fuel ratio sensor has abnormality and when the air/fuel ratio sensor does not have abnormality (is normal). This is because as the intake air amount of the engine 1 increases, the exhaust gas pressure of the internal combustion engine (that corresponds to the amount of flow of exhaust gas) rises, so that increased amounts of exhaust gas come to pass through the air/fuel ratio sensor. However, when the air/fuel ratio sensor does not have abnormality (is normal), the degree of change of the responsiveness parameter to a value that shows good responsiveness in association with increase in the intake air amount tends to become considerably large, in comparison with when the air/fuel ratio sensor has abnormality. This is because when the air/fuel ratio sensor has abnormality, the decline of the responsiveness of the output of the air/fuel ratio sensor associated with the abnormality appears more greatly the larger the intake air amount is, and therefore the degree of change of the responsiveness parameter to a value that shows good responsiveness in association with increase in the intake air amount becomes smaller. Therefore, with regard to the degree of change of the responsiveness parameter to a value that shows good responsiveness in association with increase in the intake air amount, the difference made by the presence/absence of abnormality of the air/fuel ratio sensor appears greatly.

It is to be noted herein that the degree of change of the responsiveness parameter to a value that shows good responsiveness in association with increase in the intake air amount is represented by the gradient of the straight line determined on the basis of the data obtained by the foregoing plurality of acquisitions of data. Therefore, with regard to the gradient of the straight line, the difference made by the presence/absence of abnormality of the air/fuel ratio sensor appears greatly. The difference made by the presence/absence of abnormality of the air/fuel ratio sensor appearing greatly in the foregoing gradient means that when the abnormality criterion value is shifted toward the side of normality in order to severely perform the determination as to the presence/absence of abnormality of the air/fuel ratio sensor, a certain size of interval can be provided between the abnormality criterion value and the gradient of the straight line determined when the air/fuel ratio sensor is normal. Therefore, even if, in the determination as to the presence/absence of abnormality of the air/fuel ratio sensor on the basis of comparison between the gradient of the straight line and the abnormality criterion value, the abnormality criterion value is shifted toward the side of normality so as to make the determination severer, that is, make it more likely to determine that the air/fuel ratio sensor has abnormality, it is still possible to accurately perform the determination as to the presence/absence of abnormality of the air/fuel ratio sensor.

A abnormality detection method for an air/fuel ratio sensor in accordance with a second aspect of the invention is an abnormality detection method for an air/fuel ratio sensor that outputs a signal that corresponds to air/fuel ratio of an internal combustion engine based on oxygen concentration in exhaust gas of the internal combustion engine, the method including: performing an active air/fuel ratio control of periodically fluctuating the air/fuel ratio of the internal combustion engine between a rich state and a lean state; acquiring, as data for detecting abnormality, a parameter that corresponds to responsiveness during change of output of the air/fuel ratio sensor between a rich peak and a lean peak during the active air/fuel ratio control; setting a straight line that represents a tendency of change of the parameter relative to change in intake air amount of the internal combustion engine based on the data acquired by a plurality of times; and determining presence/absence of abnormality of the air/fuel ratio sensor based on comparison between an abnormality criterion value and a gradient of the straight line.

The abnormality detection method for an air/fuel ratio sensor in accordance with the second aspect of the invention achieves substantially the same effects as the abnormality detection apparatus for an air/fuel ratio sensor in accordance with the first aspect.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Hereinafter, an embodiment in which the invention is embodied in an abnormality detection apparatus for an air/ fuel ratio sensor provided in a motor vehicle engine will be described with reference to FIG. 1 to FIG. 8. In an engine 1 shown in FIG. 1, an intake passageway 3 and an exhaust passageway 4 are connected to a combustion chamber 2 of each cylinder. The combustion chamber 2 of each cylinder is charged with a mixture made of air and fuel as air is taken into the combustion chamber 2 via the intake passageway 3 that is provided with a throttle valve 11 for adjusting the amount of intake air of the engine 1 and the fuel is supplied into the intake passageway 3 by injection from a fuel injection valve 5. When the mixture burns on the basis of ignition by an ignition plug 6 of each cylinder, the combustion energy produced at that time moves a piston 7 back and forth, so that a crankshaft 8 that is the output shaft of the engine 1 is rotated. Besides, the post-combustion mixture is sent out as exhaust gas into the exhaust passageway 4.

Figure 1:
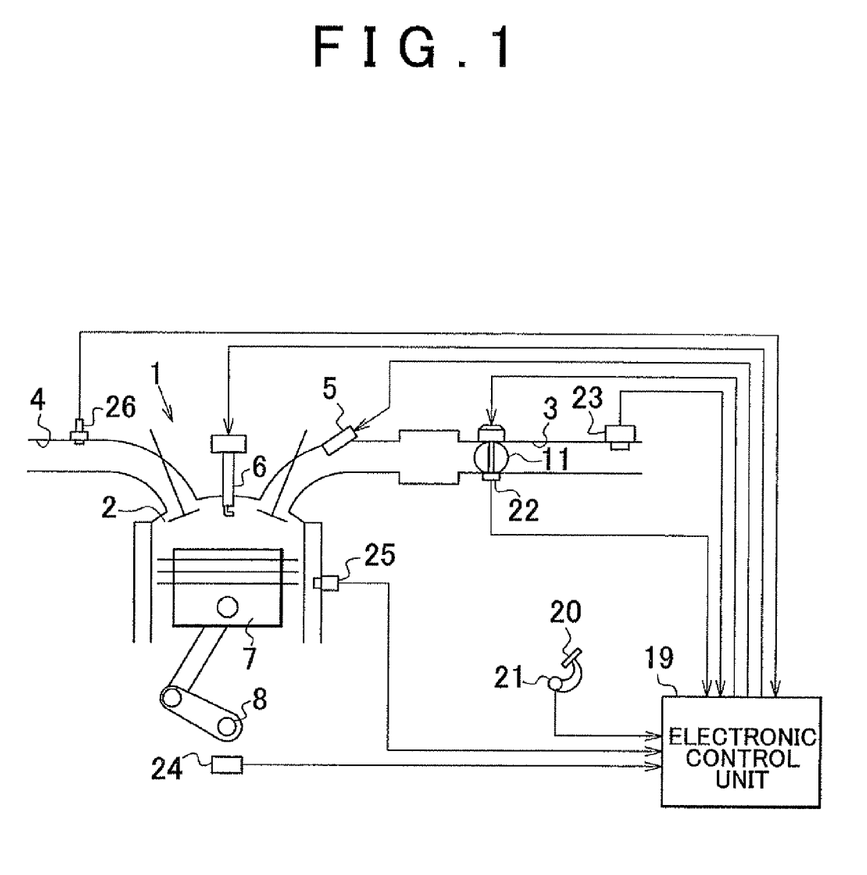
FIG. 1 is a simplified diagram showing the entire engine to which an abnormality detection apparatus for an air/fuel ratio sensor in accordance with embodiments of the invention.

The motor vehicle in which the engine 1 is mounted as a prime mover is provided with an electronic control unit (ECU) 19 that executes various controls such as an operation control of the engine 1, etc. This electronic control unit 19 includes a CPU that executes various computations and processes related to the various controls, a ROM that stores programs and data needed for the controls, a RAM that temporarily stores results of the computations performed by the CPU, and the like, input/output ports for inputting signals from and outputting signals to external devices, etc.

Various sensors and the like as mentioned below are connected to the input ports of the electronic control unit 19. The various sensors include an accelerator pedal position sensor 21 that detects the amount of depression of an accelerator pedal 20 that is depressed by a driver of the motor vehicle (accelerator pedal depression amount), a throttle position sensor 22 that detects the degree of opening of the throttle valve 11 provided in the intake passageway 3 of the engine 1 (throttle opening degree), an air flow meter 23 that detects the amount of air (intake air amount) taken into the combustion chamber 2 of each cylinder through the intake passageway 3, a crank position sensor 24 that outputs a signal that corresponds to the rotation of the crankshaft 8, a water temperature sensor 25 that detects the cooling water temperature of the engine 1, and an air/fuel ratio sensor 26 that is provided in the exhaust passageway 4 and outputs a signal commensurate with the oxygen concentration in exhaust gas of the engine 1.

Besides, the drive circuits of various appliances, such as the fuel injection valves 5, the ignition plugs 6, the throttle valve 11, etc., are connected to the output ports of the electronic control unit 19.

The electronic control unit 19 outputs command signals to the drive circuits of the various appliances connected to the output ports, according to the state of operation of the engine 1 that is grasped by the detection signals input from the various sensors. In this manner, the electronic control unit 19 executes various controls such as an ignition timing control of the ignition plugs 6, an opening degree control of the throttle valve 11, a control of the fuel injection via the fuel injection valves 5, etc.

An example of the control of the fuel injection via the fuel injection valves 5 is a fuel injection amount control that includes air/fuel ratio feedback correction of the amount of fuel injection. The air/fuel ratio feedback correction of the fuel injection amount is realized by increasing or decreasing an air/fuel ratio feedback correction value FD for correcting the fuel injection amount on the basis of the output VAF of the air/fuel ratio sensor 26 and the like so that the air/fuel ratio of the engine 1 becomes equal to a stoichiometric air/fuel ratio, and then by performing the correction with the air/fuel ratio feedback correction value FD. By controlling the air/fuel ratio of the engine 1 to the stoichiometric air/fuel ratio through the air/fuel ratio feedback correction, it becomes possible to maintain good performance of exhaust purification of exhaust purification catalysts provided in the exhaust passageway 4 of the engine 1 and therefore better the exhaust emission of the engine 1.

Figure 2:
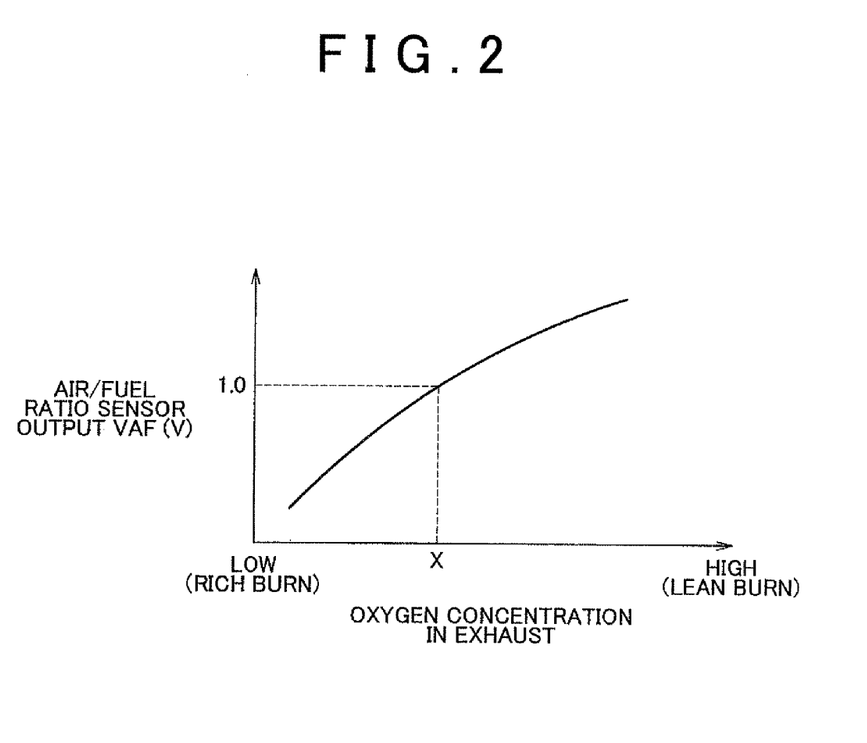
FIG. 2 is a graph showing changes of the output of the air/fuel ratio sensor relative to changes in the oxygen concentration in exhaust gas in embodiments of the invention.

The output VAF of the air/fuel ratio sensor 26 becomes smaller the lower the oxygen concentration in exhaust gas becomes, as shown in FIG. 2. When the mixture is burned at the stoichiometric air/fuel ratio, the output VAF of the air/fuel ratio sensor 26 becomes, for example, "1.0 V", corresponding to the then oxygen concentration X in exhaust gas. Therefore, the lower the oxygen concentration in exhaust gas becomes due to combustion of rich mixture (rich combustion), the smaller the output VAF of the air/fuel ratio sensor 26 becomes in the range below "1.0 V". Besides, the higher the oxygen concentration in exhaust gas becomes due to combustion of lean mixture (lean combustion), the greater the output VAF of the air/fuel ratio sensor 26 becomes in the range above "1.0 V". Then, as the output VAF of the air/fuel ratio sensor 26 becomes greater in the range above "1.0", the air/fuel ratio feedback correction value FD is gradually increased so as to increase the amount of fuel injection of the engine 1. Besides, as the output VAF of the air/fuel ratio sensor 26 becomes smaller in the range below "1.0", the air/fuel ratio feedback correction value FD is gradually reduced so as to reduce the amount of fuel injection of the engine 1. By correcting the amount of fuel injection of the engine 1 in the increasing or decreasing direction on the basis of the air/fuel ratio feedback correction value FD that changes in the foregoing manner, the air/fuel ratio of the engine 1 is controlled to the stoichiometric air/fuel ratio.

Figure 3:
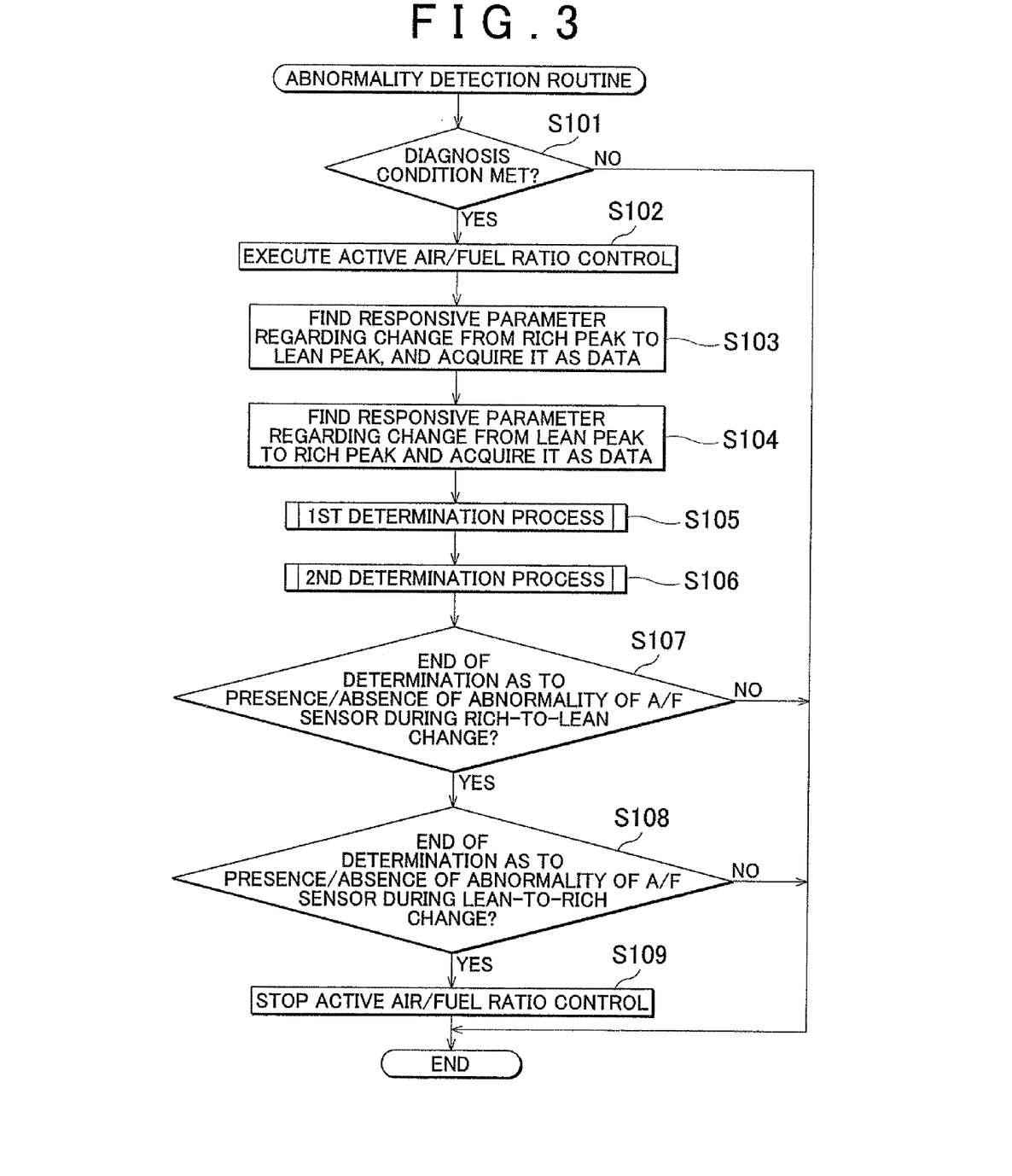
FIG. 3 is a flowchart showing an execution procedure of an abnormality detection process for determining the presence/absence of abnormality of the air/fuel ratio sensor in embodiments of the invention.

Next, an abnormality detection process for determining the presence/absence of abnormality of the air/fuel ratio sensor 26, such as degradation thereof or the like, which is performed via the electronic control unit 19 will be described with reference to the flowchart of FIG. 3, which shows an abnormality detection process routine for executing the abnormality detection process. This abnormality detection process routine is periodically executed by, for example, a time interrupt at every predetermined time, via the electronic control unit 19.

In this abnormality detection process routine, firstly, it is determined whether or not a diagnosis condition that is a prerequisite condition for executing the abnormality detection process has been satisfied (S101). The determination that the diagnosis condition has been satisfied is made upon satisfaction of the conditions that, for example, the cooling water temperature, the rotation speed, the load, the fluctuation of the air/fuel ratio, the amount of intake air (intake air amount), the fluctuation of the intake air amount, etc. of the engine 1 are all within regions that allow the abnormality detection process to be executed. Incidentally, the engine rotation speed is found on the basis of a detection signal from the crank position sensor 24. Besides, the engine load is calculated from a parameter that corresponds to the intake air amount of the engine 1, and the engine rotation speed. Examples of the parameter corresponding to the intake air amount which is used herein include an actually measured value of the intake air amount of the engine 1 which is found on the basis of the detection signal from the air flow meter 23, the degree of throttle opening detected by the throttle position sensor 22, etc.

Figure 4:
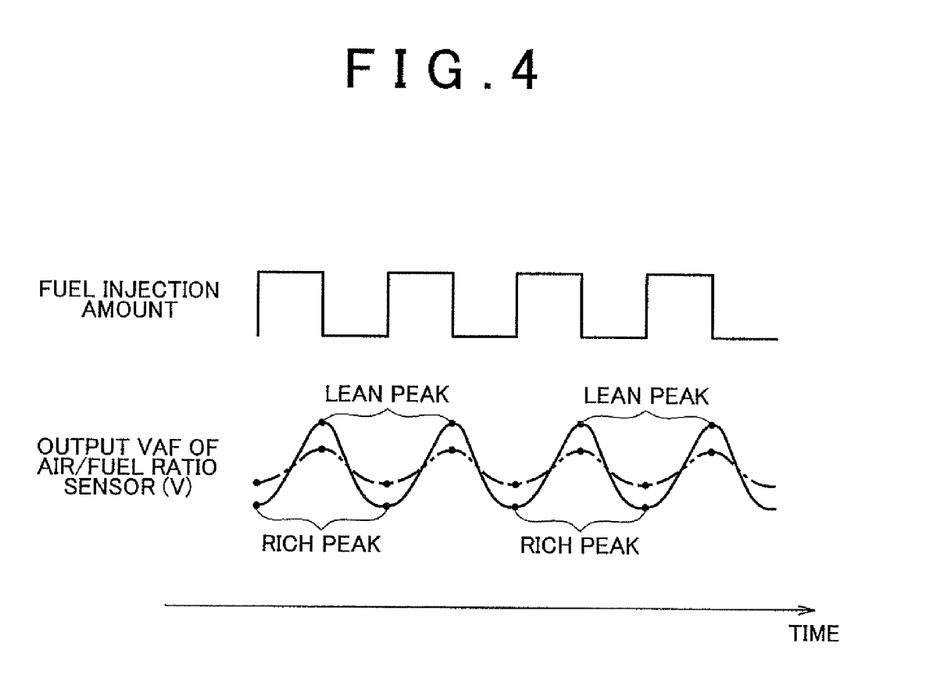
FIG. 4 is a time chart showing a manner of increases and decreases of the amount of fuel injection during an active air/fuel ratio control, and a manner of changes of the output of the air/fuel ratio sensor in embodiments of the invention.

If in step S101 it is determined that the diagnosis condition has been satisfied, the active air/fuel ratio control for acquiring data for use for the determination as to the presence/absence of abnormality of the air/fuel ratio sensor 26 is executed (S102). In the active air/fuel ratio control, the amount of fuel injection of the engine 1 is periodically increased and decreased, for example, as shown in FIG. 4, and therefore the air/fuel ratio of the engine 1 is periodically fluctuated between a state in which the air/fuel ratio is richer than the stoichiometric air/fuel ratio and a state in which the air/fuel ratio is leaner than the stoichiometric air/fuel ratio. Incidentally, the amount of change of the air/fuel ratio relative to the stoichiometric air/fuel ratio when the air/fuel ratio of the engine 1 is fluctuated by the active air/fuel ratio control is set at, for example, about 3% of the stoichiometric air/fuel ratio to the rich side and the lean side from the stoichiometric air/fuel ratio.

When the active air/fuel ratio control is performed, a process of finding a parameter that corresponds to the responsiveness of the output VAF of the air/fuel ratio sensor 26 (hereinafter, referred to as "responsiveness parameter") on the basis of the output VAF of the air/fuel ratio sensor 26 during the active air/fuel ratio control, and acquiring the parameter as data for use for abnormality detection is performed (S103 and S104 in FIG. 3). The responsiveness parameter used herein may be a maximum value θmax of the rate θ of change of the output VAF of the air/fuel ratio sensor 26 occurring when the output VAF of the air/fuel ratio sensor 26 changes between the rich peak and the lean peak. Herein, the rate θ of change of the output VAF of the air/fuel ratio sensor 26 is a value that represents change of the output VAF of the air/fuel ratio sensor 26 per unit time, and is calculated in the following manner. That is, the output VAF is taken at every predetermined time interval Δt during the period of the change between the rich peak and the lean peak, and at every one of such take-up, the rate θ of change is calculated using the following expression.

$$\theta = (\text{present VAF} - \text{previous VAF})/\Delta t \quad (1)$$

Hence, when the change of the output VAF of the air/fuel ratio sensor 26 from the rich peak to the lean peak is completed, the then maximum value θmax (maximum value in a positive direction) of the rate θ of change of the output VAF of the air/fuel ratio sensor 26 during the time from the rich peak to the lean peak is determined. Then, the maximum value θmax of the rate θ of change of the output VAF of the air/fuel ratio sensor 26 is acquired as data that corresponds to the responsiveness parameter for the time from the rich peak to the lean peak (S103). More specifically, the maximum value θmax of the rate θ of change of the output VAF of the air/fuel ratio sensor 26 is stored into the RAM of the electronic control unit 19. The storage of the maximum value θmax in this manner is performed every time the change of the output VAF of the air/fuel ratio sensor 26 from the rich peak to the lean peak is completed during the active air/fuel ratio control.

Besides, when the change of the output VAF of the air/fuel ratio sensor 26 from the lean peak to the rich peak is completed, the maximum value θmax (the maximum value in the negative direction) of the rate θ of change of the output VAF of the air/fuel ratio sensor 26 during the time from the lean peak to the rich peak is determined. Then, the maximum value θmax of the rate θ of change of the output VAF of the air/fuel ratio sensor 26 during the time from the lean peak to the rich peak is acquired as data that corresponds to the responsiveness parameter (S104). More specifically, the maximum value θmax of the rate θ of change of the output VAF of the air/fuel ratio sensor 26 is stored into the RAM of the electronic control unit 19. This storage of the maximum value θmax is performed every time the change of the output VAF of the air/fuel ratio sensor 26 from the lean peak to the rich peak is completed during the active air/fuel ratio control.

After data (maximum value θmax) is acquired in the foregoing manner, a first determination process (S105) for determining the presence/absence of abnormality of the air/fuel ratio sensor 26 occurring during the change of the output VAF of the air/fuel ratio sensor 26 from the rich state to the lean state. It is conceivable that in this first determination process, the determination as to the presence/absence of abnormality of the air/fuel ratio sensor 26 is performed, for example, in the following manner. Specifically, the presence/absence of abnormality of the air/fuel ratio sensor 26 is determined on the basis of comparison between an abnormality criterion value and the data obtained with regard to the change of the output VAF of the air/fuel ratio sensor 26 from the rich peak to the lean peak during the active air/fuel ratio control. Furthermore, a second determination process (S106) for determining the presence/absence of abnormality of the air/fuel ratio sensor 26 occurring during the change of the output VAF of the air/fuel ratio sensor 26 from the lean state to the rich state is also performed. It is conceivable that in the second determination process, the determination as to the presence/absence of abnormality of the air/fuel ratio sensor 26 is performed, for example, in the following manner. That is, the presence/absence of abnormality of the air/fuel ratio sensor 26 is determined on the basis of comparison between the abnormality criterion value and the data obtained with regard to the change of the output VAF of the air/fuel ratio sensor 26 from the lean peak to the rich peak during the active air/fuel ratio control.

Then, if the determination as to the presence/absence of abnormality of the air/fuel ratio sensor 26 occurring during the change of the output VAF of the air/fuel ratio sensor 26 from the rich state to the lean state ends (YES in S107) and the determination as to the presence/absence of abnormality of the air/fuel ratio sensor 26 occurring during the change of the output VAF of the air/fuel ratio sensor 26 from lean state to the rich state ends (YES in S108), the active air/fuel ratio control is stopped (S109).

By the way, as stated above in conjunction with the related art, in recent years, the requirement for better exhaust emission of the engine 1 has become severer, and it is determined that an air/fuel ratio sensor 26 that does not meet the requirement is abnormal. Concretely, it is conceivable that the abnormality criterion value used in the first determination process (S105) and the abnormality criterion value used in the second determination process (S106) are both shifted toward the side of normality, whereby it is more likely to be determined that the air/fuel ratio sensor 26 has abnormality.

However, if the determination as the presence/absence of abnormality of the air/fuel ratio sensor 26 is performed more severely so that it is more likely to be determined that the sensor 26 has abnormality as described above, the difference between the output VAF of the air/fuel ratio sensor 26 during normality thereof and the output VAF of the air/fuel ratio sensor 26 during abnormality thereof becomes small, so that the responsiveness parameters (maximum values θmax) found in steps S103 and S104 less clearly represent a difference made by the presence/absence of abnormality of the air/fuel ratio sensor 26. In particular, during the small-amount-of-intake-air state of the engine 1, the exhaust gas pressure of the engine 1 (that corresponds to the amount of flow of exhaust gas) declines, and the influence caused by abnormality of the air/fuel ratio sensor 26, such as degradation or the like, comes to less clearly appear in the output VAF of the air/fuel ratio sensor 26, the foregoing tendency of the responsiveness parameters (maximum values θmax) representing less clearly the difference made by the presence/absence of abnormality of the air/fuel ratio sensor becomes conspicuous. Furthermore, when the motor vehicle is accelerating or decelerating during the small-amount-of-intake-air state of the engine 1, the responsiveness parameters (maximum values θmax) greatly fluctuate due to the response delay of various appliances of the engine 1, so that there is high possibility that the data acquired in steps S103 and S104 will each have a value that makes it hard to determine the presence/absence of abnormality of the air/fuel ratio sensor 26.

As described above, if the responsiveness parameters (maximum values θmax) found in steps S103 and S104 less clearly represent a difference made by the presence/absence of abnormality of the air/fuel ratio sensor 26, there results a drawback that it becomes difficult to accurately perform the determination as to the presence/absence of abnormality of the air/fuel ratio sensor 26 in the first determination process (S105) and the second determination process (S106). Hereinafter, reasons for this will be explained in detail with reference to FIG. 5 ad FIG. 6, and outlines of countermeasures for the foregoing drawback will be described with reference to FIGS. 5 and 6.

Figure 5:
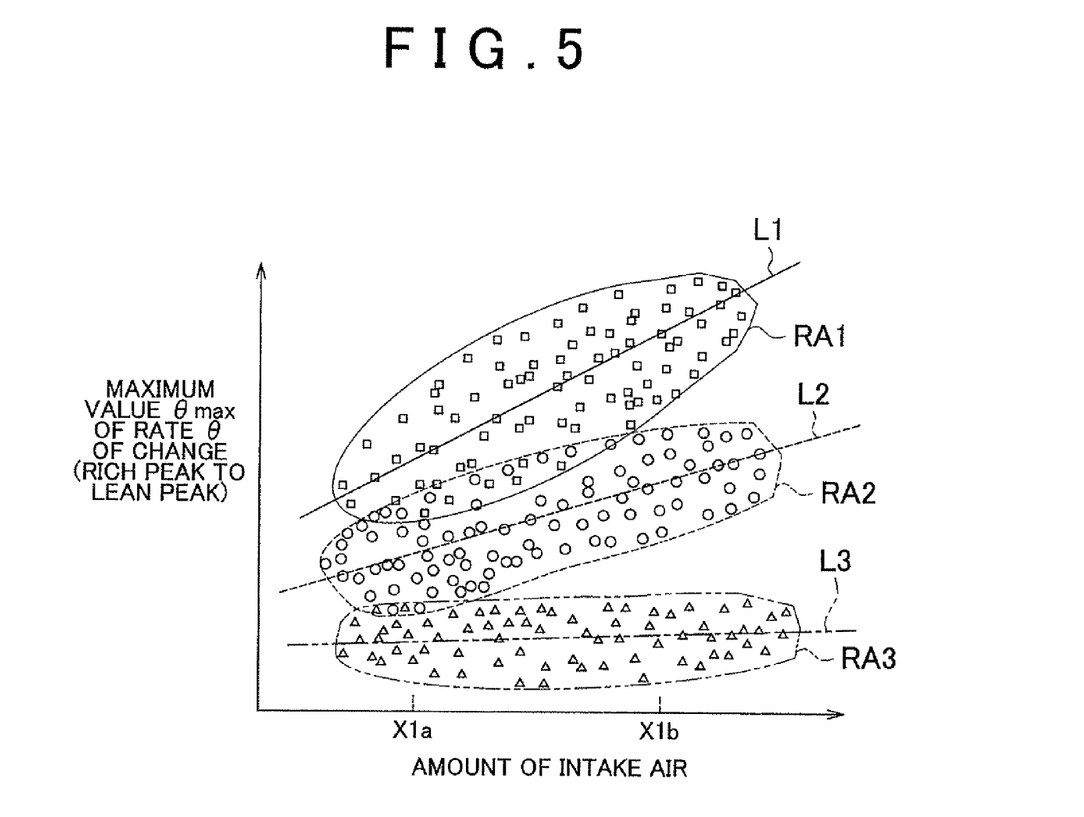
FIG. 5 is a distribution diagram showing the distribution of the maximum value $\theta$max of the rate $\theta$ of change acquired as data of the responsiveness parameter when the output of the air/fuel ratio sensor changes from a rich peak to a lean peak during the active air/fuel ratio control in embodiments of the invention.

FIG. 5 shows the distribution of the maximum values θmax acquired as data of the responsiveness parameter when the output VAF of the air/fuel ratio sensor 26 changes from the rich peak to the lean, peak. In the diagram of FIG. 5, a symbol ""⊛"" indicates the data acquired when the air/fuel ratio sensor 26 is normal, and a symbol "○" indicates the data acquired when the air/fuel ratio sensor 26 is normal but in an lower-limit permissible state in conjunction with abnormality, and a symbol "Δ" indicates data acquired when the air/fuel ratio sensor 26 is in an abnormal state due to degradation or the like of the air/fuel ratio sensor 26.

A region RA1 in which data indicated by ""⊛"" are distributed is located above (in the diagram) a region RA2 in which data indicated by "○" are distributed, and the region RA2 is located above (in the diagram) a region RA3 in which data indicated by the "Δ" are distributed. This data distribution results because if the air/fuel ratio sensor 26 has abnormality such as degradation or the like, the responsiveness of the output VAF of the air/fuel ratio sensor 26 during the active air/fuel ratio control deteriorates as shown by a dashed two-dotted line in the time chart of the output VAF of the air/fuel ratio sensor 26 shown in FIG. 4 from a normal state (shown by a solid line in the time chart), and the influence thereof appears in the distribution of data in FIG. 5. Besides, the regions RA1, RA2 and RA3 are displaced upward in the diagram to an extent that is greater the greater the intake air amount of the engine 1. This is because as the amount of intake air of the engine 1 increases, the exhaust gas pressure of the engine 1 (that corresponds to the amount of flow of exhaust gas) rises, so that increased amounts of exhaust gas come to pass through the air/fuel ratio sensor 26, whereby the responsiveness of the output VAF of the air/fuel ratio sensor 26 relative to changes of the actual air/fuel ratio of the engine 1 is improved.

If the abnormality criterion value used in the first determination process (S105 in FIG. 3) is shifted toward the side of normality corresponding to the severe requirement regarding the exhaust emission of the engine 1, the determination as to the presence/absence of abnormality of the air/fuel ratio sensor 26 comes to be severely performed. In this case, since the air/fuel ratio sensor 26 is regarded as being abnormal if the sensor does not meet the severe requirement regarding the exhaust emission, the region RA2 and the region RA3 become closer to each other in the vertical direction, so that the region RA2 and the region RA3 overlap with each other when the engine 1 is in the small-amount-of-intake-air state. The region RA2 and the region RA3 overlapping with each other in this manner means that in and around the overlapping area, the difference made by the presence/absence of abnormality of the air/fuel ratio sensor 26 has come to less clearly appear in the responsiveness parameter (maximum value θmax). This gives rise to a drawback that it is difficult to accurately perform the determination as to the presence/absence of abnormality of the air/fuel ratio sensor 26 in the first determination process.

As a countermeasure against this drawback, the determination as to the presence/absence of abnormality of the air/fuel ratio sensor 26 in the first determination process of this embodiment is performed in the following manner, on the basis of the data (maximum value θmax) acquired every time the output VAF of the air/fuel ratio sensor 26 changes from the rich peak to the lean peak. That is, on the basis of the data (maximum value θmax) acquired every time the output VAF of the air/fuel ratio sensor 26 changes from the rich peak to the lean peak, a straight line that represents a tendency of change of the data relative to change in the intake air amount of the engine 1 is determined. Then, on the basis of comparison between the gradient of the straight line and the abnormality criterion value, the presence/absence of abnormality of the air/fuel ratio sensor 26 is determined.

As shown in FIG. 5, the degrees of displacement of the regions RA1, RA2 and RA3 toward an upper side in the graph relative to increases in the intake air amount of the engine 1, in other words, the degrees of the change of the responsiveness parameter (maximum value θmax) to a value that shows good responsiveness in association with increases in the intake air amount, tend to become considerably larger in the order of the region RA3, the region RA2 and the region RA1. This is because when the air/fuel ratio sensor 26 has abnormality, the decline of the responsiveness of the output VAF of the air/fuel ratio sensor 26 associated with the abnormality appears more greatly the larger the intake air amount is, and therefore the degree of the change of the responsiveness parameter to a value that shows good responsiveness in association with increase in the intake air amount (in this case, the degree of change thereof in a positive direction) becomes smaller. Therefore, with regard to the degree of change of the responsiveness parameter to a value that shows good responsiveness in association with increase in the intake air amount, the difference made by the presence/absence of abnormality of the air/fuel ratio sensor 26 appears greatly.

The degree of change of the responsiveness parameter to a value that shows good responsiveness in association with increase in the intake air amount is represented by the gradient of the foregoing straight line determined on the basis of the data (maximum value θmax) acquired every time the output VAF of the air/fuel ratio sensor 26 changes from the rich peak to the lean peak. Incidentally, in FIG. 5, a solid line L1 shows the straight line determined when the air/fuel ratio sensor 26 is in a normal state, and a broken line L2 shows the straight line determined when the air/fuel ratio sensor 26 is normal but in a permissible lower-limit state in conjunction with abnormality, and a two-dot dashed line L3 shows the straight line determined when the air/fuel ratio sensor 26 is in an abnormal state such as a degraded state or the like. With regard to the gradients of the foregoing straight lines (L1, L2, L3, etc.), the difference made by the presence/absence of abnormality of the air/fuel ratio sensor 26 appears greatly. The difference made by the presence/absence of abnormality of the air/fuel ratio sensor 26 appearing greatly in the foregoing gradient means that when the abnormality criterion value is shifted toward the side of normality in order to severely perform the determination as to the presence/absence of abnormality of the air/fuel ratio sensor 26, a certain size of interval can be provided between the abnormality criterion value and the gradient of the straight line determined when the air/fuel ratio sensor 26 is normal. Therefore, even if, in the determination as to the presence/absence of abnormality of the air/fuel ratio sensor 26 on the basis of comparison between the gradient of the straight line and the abnormality criterion value, the abnormality criterion value is shifted toward the side of normality so as to make the determination severer, that is, make it more likely to determine that the air/fuel ratio sensor 26 has abnormality, it is still possible to accurately perform the determination as to the presence/absence of abnormality of the air/fuel ratio sensor 26.

Figure 6:
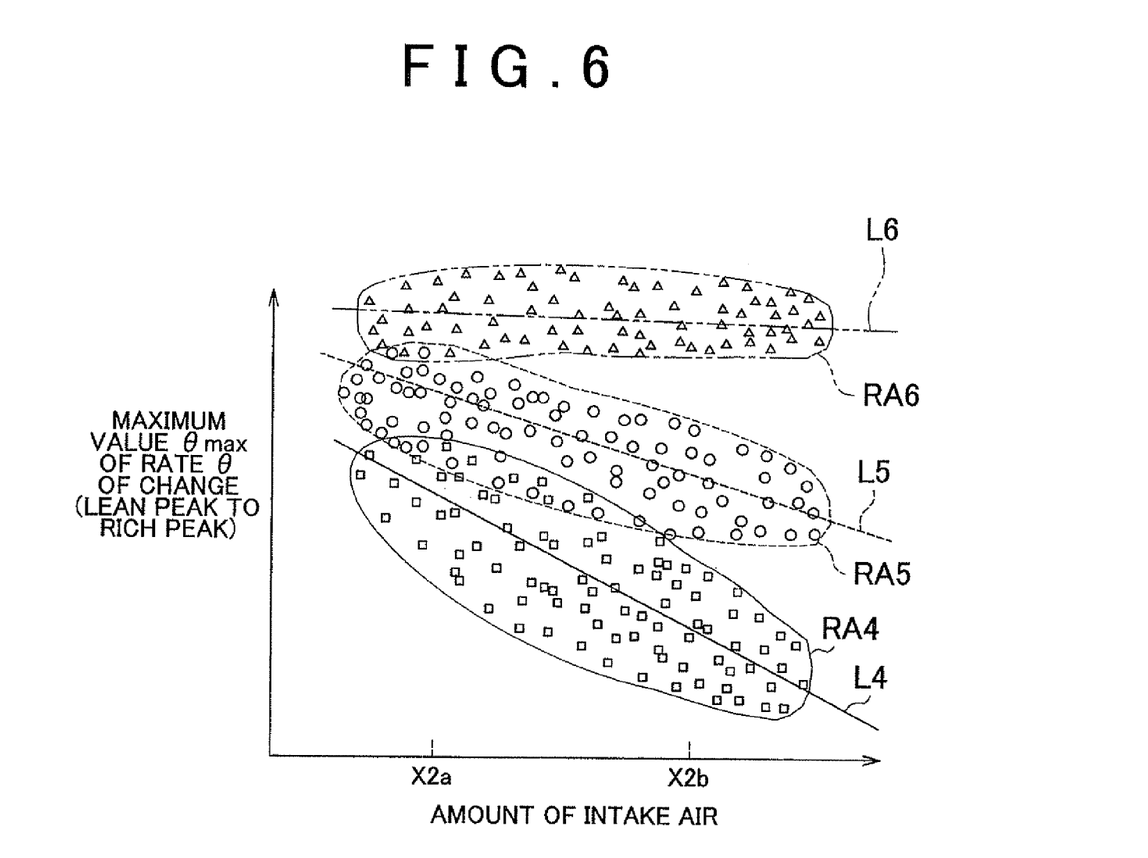
FIG. 6 is a distribution diagram showing the distribution of the maximum value $\theta$max of the rate $\theta$ of change acquired as data of the responsiveness parameter when the output of the air/fuel ratio sensor changes from the lean peak to the rich peak during the active air/fuel ratio control in embodiments of the invention.

FIG. 6 is a diagram showing the distribution of the maximum values θmax that are acquired as data for the responsiveness parameter when the output VAF of the air/fuel ratio sensor 26 changes from the lean peak to the rich peak. Incidentally, in this diagram of FIG. 6, a symbol "" ⊛ "" indicates the data acquired when the air/fuel ratio sensor 26 is normal, and a symbol "○" indicates the data acquired when the air/fuel ratio sensor 26 is normal but in an lower-limit permissible state in conjunction with abnormality, and a symbol "Δ" indicates data acquired when the air/fuel ratio sensor 26 is in an abnormal state of the air/fuel ratio sensor 26, as in FIG. 5.

A region RA4 in which data indicated by "" ⊛ "" are distributed is located below (in the diagram) a region RA5 in which data indicated by "○" are distributed, and the region RA5 is located below (in the diagram) a region RA6 in which data indicated by the "Δ" are distributed. This data distribution results because if the air/fuel ratio sensor 26 has abnormality such as degradation or the like, the responsiveness of the output VAF of the air/fuel ratio sensor 26 during the active air/fuel ratio control deteriorates as shown by the dashed two-dotted line in the time chart of the output VAF of the air/fuel ratio sensor 26 shown in FIG. 4 from a normal state (shown by the solid line in the time chart), and the influence thereof appears in the distribution of data in FIG. 6. Besides, the regions RA4, RA5 and RA6 are displaced downward in the diagram to an extent that is greater the greater the intake air amount of the engine 1. This is because as the amount of intake air of the engine 1 increases, the exhaust gas pressure of the engine 1 (that corresponds to the amount of flow of exhaust gas) rises, so that increased amounts of exhaust gas come to pass through the air/fuel ratio sensor 26, whereby the responsiveness of the output VAF of the air/fuel ratio sensor 26 relative to changes of the actual air/fuel ratio of the engine 1 is improved.

If the abnormality criterion value used in the second determination process (S106 in FIG. 3) is shifted toward the side of normality corresponding to the severe requirement regarding the exhaust emission of the engine 1, the determination as to the presence/absence of abnormality of the air/fuel ratio sensor 26 comes to be severely performed. In this case, since the air/fuel ratio sensor 26 is regarded as being abnormal if the sensor does not meet the severe requirement regarding the exhaust emission, the region RA5 and the region RA6 become closer to each other in the vertical direction, so that the region RA5 and the region RA6 overlap with each other when the engine 1 is in the small-amount-of-intake-air state. The region RA5 and the region RA6 overlapping with each other in this manner means that in and around the overlapping area, the difference made by the presence/absence of abnormality of the air/fuel ratio sensor 26 has come to less clearly appear in the responsiveness parameter (maximum value θmax). This gives rise to a drawback that it is difficult to accurately perform the determination as to the presence/absence of abnormality of the air/fuel ratio sensor 26 in the second determination process.

As a countermeasure against this drawback, the determination as to the presence/absence of abnormality of the air/fuel ratio sensor 26 in the second determination process of this embodiment is performed in the following manner, on the basis of the data (maximum value θmax) acquired every time the output VAF of the air/fuel ratio sensor 26 changes from the lean peak to the rich peak. That is, on the basis of the data (maximum value θmax) acquired every time the output VAF of the air/fuel ratio sensor 26 changes from the lean peak to the rich peak, the straight line that represents the tendency of change of the data relative to change in the intake air amount of the engine 1 is determined. Then, on the basis of comparison between the gradient of the straight line and the abnormality criterion value, the presence/absence of abnormality of the air/fuel ratio sensor 26 is determined.

As shown in FIG. 6, the degrees of displacement of the regions RA4, RA5 and RA6 toward a lower side in the graph relative to increases in the intake air amount of the engine 1, that is, the degrees of the change of the responsiveness parameter (maximum value θmax) to a value that shows good responsiveness with increases in the intake air amount, tend to become considerably larger in the order of region RA6, region RA5 and the region RA4. This is because when the air/fuel ratio sensor 26 has abnormality, the decline of the responsiveness of the output VAF of the air/fuel ratio sensor 26 associated with the abnormality appears more greatly the larger the intake air amount is, and therefore the degree of the change of the responsiveness parameter to a value that shows good responsiveness in association with increase in the intake air amount (in this case, the degree of change thereof in the negative direction) becomes smaller. Therefore, with regard to the degree of change of the responsiveness parameter to a value that shows good responsiveness in association with increase in the intake air amount, the difference made by the presence/absence of abnormality of the air/fuel ratio sensor 26 appears greatly.

The degree of change of the responsiveness parameter to a value that shows good responsiveness in association with increase in the intake air amount is represented by the gradient of the foregoing straight line determined on the basis of the data (maximum value θmax) acquired every time the output VAF of the air/fuel ratio sensor 26 changes from the lean peak to the rich peak. Incidentally, in FIG. 6, a solid line L4 shows the straight line determined when the air/fuel ratio sensor 26 is in a normal state, and a broken line L5 shows the straight line determined when the air/fuel ratio sensor 26 is normal but in a permissible lower-limit state in conjunction with abnormality, and a two-dot dashed line L6 shows the straight line determined when the air/fuel ratio sensor 26 is in an abnormal state such as a degraded state or the like. With regard to the gradients of the foregoing straight lines (L4, L5, L6, etc.), the difference made by the presence/absence of abnormality of the air/fuel ratio sensor 26 appears greatly. The difference made by the presence/absence of abnormality of the air/fuel ratio sensor 26 appearing greatly in the foregoing gradient means that when the abnormality criterion value is shifted toward the side of normality in order to severely perform the determination as to the presence/absence of abnormality of the air/fuel ratio sensor 26, a certain size of interval can be provided between the abnormality criterion value and the gradient of the straight line determined when the air/fuel ratio sensor 26 is normal.

Therefore, even if, in the determination as to the presence/absence of abnormality of the air/fuel ratio sensor 26 on the basis of comparison between the gradient of the straight line and the abnormality criterion value, the abnormality criterion value is shifted toward the side of normality so as to make the determination severer, that is, make it more likely to determine that the air/fuel ratio sensor 26 has abnormality, it is still possible to accurately perform the determination as to the presence/absence of abnormality of the air/fuel ratio sensor 26.

Figure 7:
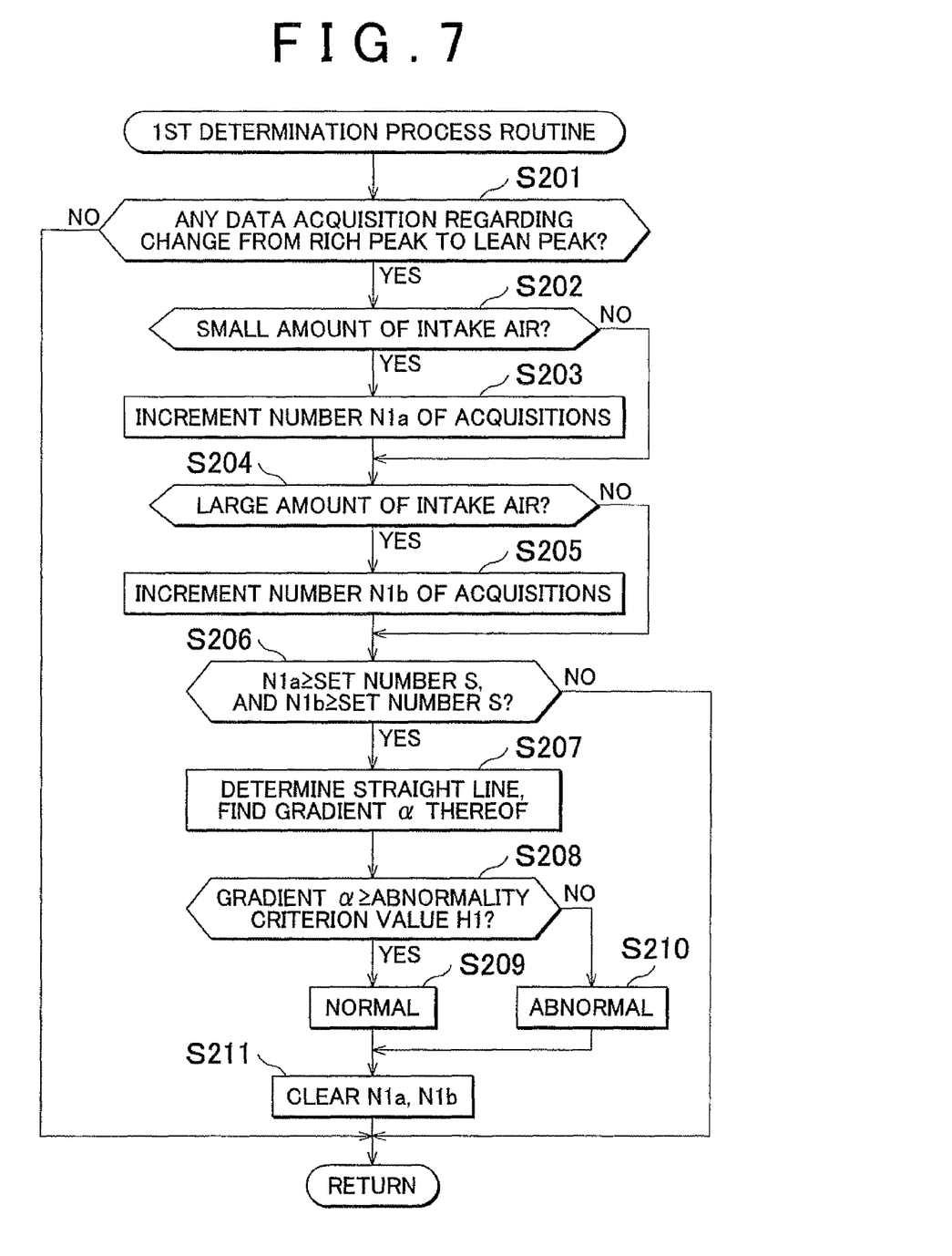
FIG. 7 is a flowchart showing an execution procedure of a first determination process that is executed in embodiments of the invention.

Next, the execution procedure of the first determination process performed in step S105 in the abnormality detection routine (FIG. 3) will be described in detail with reference to the flowchart of FIG. 7 showing a first determination process routine. This first determination process routine is executed every time the process proceeds to step S105 in the abnormality detection routine.

In the first determination process routine, it is firstly determined whether or not the change of the output VAF of the air/fuel ratio sensor 26 from the rich peak to the lean peak has been completed and the acquisition of data (maximum value θmax) regarding the change from the rich peak to the lean peak has been performed (S201).

If an affirmative determination is made in this step, it is then determined whether or not the engine 1 is in the small-amount-of-intake-air state (S202), more specifically, whether or not the intake air amount is less than a predetermined value X1$a$. The affirmative determination being made in step S202 means that the acquisition of the data was performed when the engine 1 was in the small-amount-of-intake-air region. In this case, the number N1$a$ of acquisitions of data in the small-amount-of-intake-air region of the engine 1 is incremented by "1" (S203). Besides, the determination as to whether or not the engine 1 is in the large-amount-of-intake-air state (S204), more specifically, whether or not the intake air amount is greater than or equal to a predetermined value X1$b$, is also performed. The affirmative determination being made in step S204 means that the acquisition of data was performed when the engine 1 was in the large-amount-of-intake-air region. In this case, the number N1$b$ of acquisitions of data in the large-amount-of-intake-air state of the engine 1 is incremented by "1" (S205).

The numbers N1$a$ and N1$b$ of acquisitions represent the number of times the acquisition of data has been performed in the small-amount-of-intake-air region of the engine 1, and the number of times the acquisition of data has been performed in the large-amount-of-intake-air region of the engine 1, respectively. Incidentally, the small-amount-of-intake-air region is a region in which the intake air amount is less than the predetermined value X1$a$ in FIG. 5, and in which the intake air amount is smallest in the entire region of the intake air amount of the engine 1. On the other hand, the large-amount-of-intake-air region is a region in which the intake air amount is greater than or equal to the predetermined value X1$b$ in FIG. 5, and in which the intake air amount is largest in the entire region of the intake air amount of the engine 1. The small-amount-of-intake-air region and the large-amount-of-intake-air region are apart from each other in the direction of change of the intake air amount of the engine 1. Specifically, the predetermined value X1$a$ and the predetermined value X1$b$ are apart from each other by a certain interval.

When the numbers N1$a$ and N1$b$ of acquisitions each become greater than or equal to a first set number S (e.g., five) (YES in S206), the straight line that represents the tendency of change of the data relative to change in the intake air amount of the engine 1 is determined on the basis of the data acquired every time the output VAF from the air/fuel ratio sensor 26 changes from the rich peak to the lean peak, and then the gradient α of the straight line is found (S207). Specifically, the straight line connecting the minimum value in the positive direction among the data acquired in the small-amount-of-intake-air region and the maximum value in the positive direction among the data acquired in the large-amount-of-intake-air region is determined as a straight line that represents the tendency of change of the data relative to change in the intake air amount of the engine 1. Then, on the basis of the determined straight line, the gradient α of the straight line, that is, the change of the data relative to change in the intake air amount per unit amount of intake air, is found.

After that, the determination as to the presence/absence of abnormality of the air/fuel ratio sensor 26 based on comparison between the gradient α and an abnormality criterion value H1 is performed. Specifically, if the gradient α is greater than or equal to the abnormality criterion value H1 (YES in S208), it is determined that the air/fuel ratio sensor 26 does not have abnormality during the change of the output VAF of the air/fuel ratio sensor 26 from the rich state to the lean state, but the air/fuel ratio sensor 26 is normal (S209). Besides, if the gradient α is less than abnormality criterion value H1 (NO in S208), it is determined that the air/fuel ratio sensor 26 has abnormality during the change of the output VAF of the air/fuel ratio sensor 26 from the rich state to the lean state (S210). After it is determined that the air/fuel ratio sensor 26 is normal or is abnormal (S209 or S210), the numbers N1$a$ and N1$b$ of acquisitions are cleared to "0" (S211). Incidentally, the abnormality criterion value H1 adopted herein is a value that is determined beforehand through experiments or the like so as to be an appropriate value in determining the presence/absence of abnormality of the air/fuel ratio sensor 26.

Figure 8:
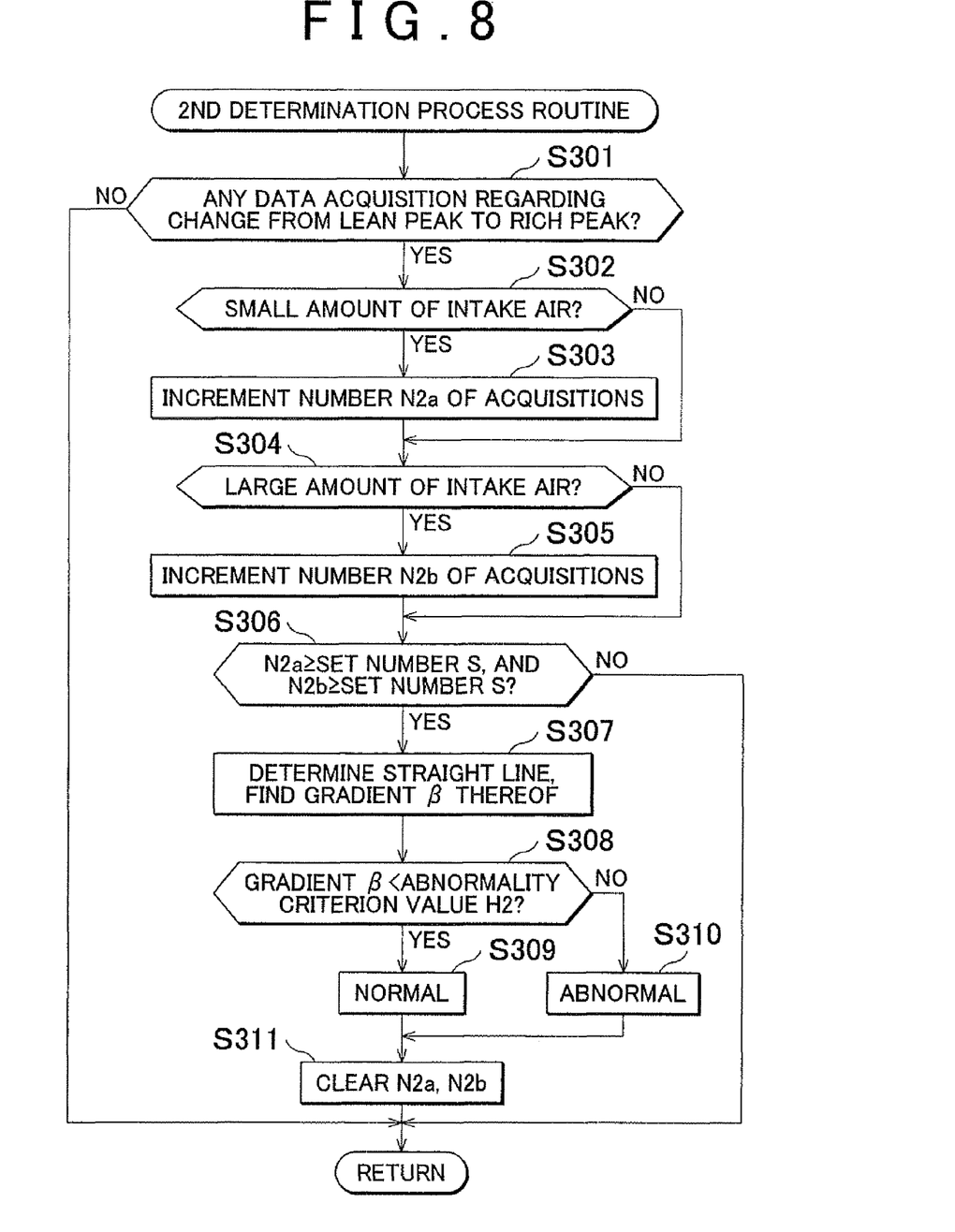
FIG. 8 is a flowchart showing an execution procedure of a second determination process that is executed in embodiments of the invention.

Next, the execution procedure of the second determination process performed in step S106 in the abnormality detection routine (FIG. 3) will be described in detail with reference to the flowchart of FIG. 8 showing a first determination process routine. The second determination process routine is executed every time the process proceeds to step S106 in the abnormality detection routine.

In the second determination process routine, it is firstly determined whether or not the change of the output VAF of the air/fuel ratio sensor 26 from the lean peak to the rich peak has been completed and the acquisition of data (maximum value θmax) regarding the change from the lean peak to the rich peak has been performed (S301).

If an affirmative determination is made in this step, it is then determined whether or not the engine 1 is in the small-amount-of-intake-air state (S302), more specifically, whether or not the intake air amount is less than a predetermined value X2$a$. The affirmative determination being made in step S302 means that the acquisition of the data was performed when the engine 1 was in the small-amount-of-intake-air region. In this case, the number N2$a$ of acquisitions of data in the small-amount-of-intake-air region of the engine 1 is incremented by "1" (S303). Besides, the determination as to whether or not the engine 1 is in the large-amount-of-intake-air state (S304), more specifically, whether or not the intake air amount is greater than or equal to a predetermined value X2$b$, is also performed. The affirmative determination being made in step S304 means that the acquisition of data was performed when the engine 1 was in the large-amount-of-intake-air region. In this case, the number N2$b$ of acquisitions of data in the large-amount-of-intake-air state of the engine 1 is incremented by "1" (S305).

The numbers N2$a$ and N2$b$ of acquisitions represent the number of times the acquisition of data has been performed in the small-amount-of-intake-air region of the engine 1, and the number of times the acquisition of data has been performed in the large-amount-of-intake-air region of the engine 1, respectively. Incidentally, the small-amount-of-intake-air region is a region in which the intake air amount is less than the predetermined value X2$a$ in FIG. 6, and in which the intake air amount is smallest in the entire region of the intake air amount of the engine 1. On the other hand, the large-amount-of-intake-air region is a region in which the intake air amount is greater than or equal to the predetermined value X2$b$ in FIG. 6, and in which the intake air amount is smallest in the entire region of the intake air amount of the engine 1. The small-amount-of-intake-air region and the large-amount-of-intake-air region are apart from each other in the direction of change of the intake air amount of the engine 1. Specifically, the predetermined value X2$a$ and the predetermined value X2$b$ are apart from each other by a certain interval.

When the numbers N2$a$ and N2$b$ of acquisitions each become greater than or equal to the first set number S (YES in S306), the straight line that represents the tendency of change of the data relative to change in the intake air amount of the engine 1 is determined on the basis of the data acquired every time the output VAF from the air/fuel ratio sensor 26 changes from the lean peak to the rich peak, and then the gradient β of the straight line is found (S307). Specifically, the straight line connecting the minimum value in the negative direction among the data acquired in the small-amount-of-intake-air region and the maximum value in the negative direction among the data acquired in the large-amount-of-intake-air region is determined as a straight line that represents the tendency of change of the data relative to change in the intake air amount of the engine 1. Then, on the basis of the determined straight line, the gradient β of the straight line, that is, the change of the data relative to change in the intake air amount per unit amount of intake air, is found.

After that, the determination as to the presence/absence of abnormality of the air/fuel ratio sensor 26 based on comparison between the gradient β and an abnormality criterion value 112 is performed. Specifically, if the gradient β is less than the abnormality criterion value 112 (YES in S308), it is determined that the air/fuel ratio sensor 26 does not have abnormality during the change of the output VAF of the air/fuel ratio sensor 26 from the lean state to the rich state, but the air/fuel ratio sensor 26 is normal (S309). Besides, if the gradient β is greater than or equal to the abnormality criterion value H2 (NO in S308), it is determined that the air/fuel ratio sensor 26 has abnormality during the change of the output VAF of the air/fuel ratio sensor 26 from the lean state to the rich state (S310). After it is determined that the air/fuel ratio sensor 26 is normal or is abnormal (S309 or S310), the numbers N2$a$ and N2$b$ of acquisitions are cleared to "0" (S311). Incidentally, the abnormality criterion value H2 adopted herein is a value that is determined beforehand through experiments or the like so as to be an appropriate value in determining the presence/absence of abnormality of the air/fuel ratio sensor 26.

According to the embodiment described above in detail, the following effects are obtained. A first effect will be described. The determination as to the presence/absence of abnormality of the air/fuel ratio sensor 26 is performed in the following procedure. That is, the active air/fuel ratio control is performed. When the output VAF of the air/fuel ratio sensor 26 changes between the rich peak and the lean peak during the active air/fuel ratio control, a responsiveness parameter (maximum value θmax) that corresponds to the responsiveness of the change is found on the basis of the output VAF, and is acquired as data for use for abnormality detection. Then, the straight line that represents the tendency of change of the responsiveness parameter relative to the change in the intake air amount of the engine 1 is determined on the basis of the data obtained by a plurality of acquisitions of data. Then, the presence/absence of abnormality of the air/fuel ratio sensor 26 is determined on the basis of comparison between the gradient α or β and the abnormality criterion value H1 or H1, respectively.

The foregoing responsiveness parameter changes to a value that represents good responsiveness in association with increase in the intake air amount of the engine 1 in both the case where the air/fuel ratio sensor 26 has abnormality and the case where the air/fuel ratio sensor 26 does not have abnormality (is normal). This is because as the intake air amount of the engine 1 increases, the exhaust gas pressure of the engine 1 (that corresponds to the amount of flow of exhaust gas) rises, so that increased amounts of exhaust gas come to pass through the air/fuel ratio sensor 26. However, when the air/fuel ratio sensor 26 does not have abnormality (is normal), the degree of change of the responsiveness parameter to a value that shows good responsiveness in association with increase in the intake air amount tends to becomes considerably large, in comparison with when the air/fuel ratio sensor 26 has abnormality. This is because when the air/fuel ratio sensor 26 has abnormality, the decline of the responsiveness of the output VAF of the air/fuel ratio sensor 26 associated with the abnormality appears more greatly the larger the intake air amount is, and therefore the degree of change of the responsiveness parameter to a value that shows good responsiveness in association with increase in the intake air amount becomes smaller. Therefore, with regard to the degree of change of the responsiveness parameter to a value that shows good responsiveness in association with increase in the intake air amount, the difference made by the presence/absence of abnormality of the air/fuel ratio sensor 26 appears greatly.

It is to be noted herein that the degree of change of the responsiveness parameter to a value that shows good responsiveness in association with increase in the intake air amount is represented by the gradient α or β of the straight line that is determined on the basis of the data obtained by the foregoing plurality of acquisitions of data. Therefore, with regard to the gradients α and β of the straight lines, the difference made by the presence/absence of abnormality of the air/fuel ratio sensor 26 appears greatly. The difference made by the presence/absence of abnormality of the air/fuel ratio sensor 26 appearing greatly in the foregoing gradient α or β means that when the abnormality criterion value H1 or H2 is shifted toward the side of normality in order to severely perform the determination as to the presence/absence of abnormality of the air/fuel ratio sensor 26, a certain size of interval can be provided between the abnormality criterion value H1 or H2 and the gradient α or β of the straight line determined when the air/fuel ratio sensor 26 is normal. Therefore, even if, in the determination as to the presence/absence of abnormality of the air/fuel ratio sensor 26 on the basis of comparison between the gradient α or β of the straight line and the abnormality criterion value H1 or H2, the abnormality criterion value is shifted toward the side of normality so as to make the determination severer, that is, make it more likely to determine that the air/fuel ratio sensor 26 has abnormality, it is still possible to accurately perform the determination as to the presence/absence of abnormality of the air/fuel ratio sensor 26.

Next, a second effect will be described. The data is acquired in each of the small-amount-of-intake-air region and the large-amount-of-intake-air region of the engine 1, and a straight line that represents the tendency of change of the responsiveness parameter relative to change in the intake air amount of the engine 1 is determined on the basis of the data acquired in the small-amount-of-intake-air region and the data acquired in the large-amount-of-intake-air region. In this manner, the foregoing straight line is determined on the basis of data acquired in a broad range of the intake air amount, including the data acquired in the small-amount-of-intake-air region and the data acquired in the large-amount-of-intake-air region. Therefore, the straight line determined on the basis of the thus-acquired data precisely represents the tendency of change of the responsiveness parameter relative to change in the intake air amount of the engine 1. Therefore, it becomes possible to precisely determine that the air/fuel ratio sensor 26 has abnormality, through the determination as to the presence/absence of abnormality of the air/fuel ratio sensor 26 based on comparison between the gradients $\alpha$ and $\beta$ and the abnormality criterion values H1 and H2, respectively.

Next, a third effect will be described. The foregoing large-amount-of-intake-air region is determined in a region where the intake air amount of the engine 1 is largest in the entire region of the intake air amount, while the small-amount-of-intake-air region is determined in a region where the intake air amount of the engine 1 is smallest in the entire region of the intake air amount. Furthermore, the large-amount-of-intake-air region and the small-amount-of-intake-air region are determined so as to be located farthest apart from each other in the entire region of the intake air amount of the engine 1. Therefore, the data acquired in the large-amount-of-intake-air region and the small-amount-of-intake-air region are the data acquired in the broadest range of the intake air amount in the entire region of the intake air amount of the engine 1. Therefore, the straight line determined on the basis of the data acquired in the large-amount-of-intake-air region and the data acquired in the small-amount-of-intake-air region more precisely represents the tendency of change of the responsiveness parameter relative to change in the intake air amount of the engine 1. Therefore, through the determination as to the presence/absence of abnormality of the air/fuel ratio sensor 26 based on comparison between the gradients $\alpha$ and $\beta$ of the straight lines and the abnormality criterion values H1 and H2, respectively, it becomes possible to more precisely determine that the air/fuel ratio sensor 26 has abnormality.

Next, a fourth effect will be described. The acquisition of data is performed a plurality of times in each of the large-amount-of-intake-air region and the small-amount-of-intake-air region of the engine 1. Then, a straight line connecting the maximum value of the data acquired in the large-amount-of-intake-air region and the minimum value of the data acquired in the small-amount-of-intake-air region is determined as the straight line that represents the tendency of change of the responsiveness parameter relative to change in the intake air amount of the engine 1. It is to be noted herein that the variation among the data acquired in the large-amount-of-intake-air region in the direction of magnitude of the data, and the variation among the data acquired in the small-amount-of-intake-air region in the direction of magnitude thereof tend to become large when the air/fuel ratio sensor 26 does not have abnormality (is normal), and become small when the air/fuel ratio sensor 26 has abnormality. This is because during the normal state of the air/fuel ratio sensor 26, the responsiveness parameter found on the basis of the output VAF of the air/fuel ratio sensor 26 fluctuates due to the influence of an external disturbance of the output VAF of the air/fuel ratio sensor 26 that is caused by a transitional operation of the engine or the like, whereas during the abnormal state of the air/fuel ratio sensor 26, the responsiveness parameter is always a value that is poor in responsiveness, regardless of the influence of an external disturbance of the output VAF of the air/fuel ratio sensor. As can be understood from what has been described above, the gradient $\alpha$ or $\beta$ of the straight line connecting the maximum value of the data acquired in the large-amount-of-intake-air region and the minimum value of the data acquired in the small-amount-of-intake-air region tend to become larger when the air/fuel ratio sensor 26 is normal than when the air/fuel ratio sensor 26 is abnormal. Therefore, the influence caused by the presence/absence of abnormality of the air/fuel ratio sensor 26 greatly occurs in the gradient $\alpha$, $\beta$ of the straight line, so that it becomes possible to facilitate the determination as to the presence/absence of abnormality of the air/fuel ratio sensor 26 based on comparison between the gradients $\alpha$ and $\beta$ and the abnormality criterion values H1 and H2, respectively.

Next, a fifth effect will be described. Through the first determination process, the straight line that represents the tendency of change of the responsiveness parameter relative to change in the intake air amount of the engine 1 is determined on the basis of the data acquired when the output VAF of the air/fuel ratio sensor 26 changes from the rich peak to the lean peak. Then, on the basis of comparison between the gradient $\alpha$ of the straight line and the abnormality criterion value H1, the presence/absence of abnormality of the air/fuel ratio sensor 26 during the change of the output VAF of the sensor 26 from the rich state to the lean state is determined. Besides, through the second determination process, the straight line that represents the tendency of change of the responsiveness parameter relative to change in the intake air amount of the engine 1 is determined on the basis of the data acquired when the output VAF of the air/fuel ratio sensor 26 changes from the lean peak to the rich peak. Then, on the basis of comparison between the gradient $\beta$ of the straight line and the abnormality criterion value H2, the presence/absence of abnormality of the air/fuel ratio sensor 26 during the change of the output VAF of the air/fuel ratio sensor 26 from the lean state to the rich state is determined. Therefore, regardless of whether there occurs an abnormality during the change of the output VAF of the air/fuel ratio sensor 26 from the rich state to the lean state or an abnormality during the change of the output VAF from the lean state to the rich state, it is possible to precisely determine that the abnormality is present.

Besides, in the case where only one of the foregoing two kinds of abnormalities has occurred, it is inevitable that when the air/fuel ratio of the engine 1 is controlled to the stoichiometric air/fuel ratio through an air/fuel ratio feedback correction based on the output VAF of the air/fuel ratio sensor 26, the center of the fluctuations of the air/fuel ratio of the engine 1 associated with that control deviates from the stoichiometric air/fuel ratio. As a result, it sometimes happens that good performance of exhaust gas purification of the exhaust purification catalyst provided in the exhaust passageway 4 of the engine 1 cannot be maintained and therefore the exhaust gas emission of the engine 1 deteriorates. However, in the embodiment, since it can be determined that abnormality has occurred even in the case where only one of the two kinds of abnormalities has occurred as described above, it is possible to restrain the foregoing deterioration of the exhaust gas emission by coping with the abnormality on the basis of the determination of the occurrence of the abnormality.

Incidentally, the foregoing embodiments may also be modified, for example, in the following manners. In the foregoing embodiments, the determination as to the presence/absence of an abnormality that occurs during the change of the output VAF of the air/fuel ratio sensor 26 from the rich state to the lean state and the determination as to the presence/absence of an abnormality that occurs during the change of the output VAF from the lean state to the rich state are performed separately from each other. However, it is not altogether necessary to adopt this manner of determination as to the presence/absence of abnormality. For example, the absolute value of the amount of change of the output VAF per unit time during the active air/fuel ratio control may be acquired as data of the responsiveness parameter, and the straight line that represents the tendency of change of the responsiveness parameter relative to change in the intake air amount of the engine 1 may be determined on the basis of the acquired data, and the presence/absence of abnormality of the air/fuel ratio sensor 26 may be determined by using the gradient of the straight line. In this case, the presence/absence of abnormality of the air/fuel ratio sensor 26 is determined regardless of the direction of change of the output VAF of the sensor 26.

Besides, the value of the set number S does not need to be five, but may be changed as appropriate, for example, to two, three, four, or six or more. A locus length ΣS between the rich peak and the lean peak of the output VAF of the air/fuel ratio sensor 26 may also be used as a responsiveness parameter that is found during the active air/fuel ratio control. Incidentally, the locus length ΣS is an integrated value of the changes of the output VAF of the air/fuel ratio sensor 26 at every predetermined time between the rich peak and the lean peak of the output VAF of the sensor 26. As for the responsiveness parameter, the use of the maximum value θmax of the rate θ of change as in the foregoing embodiments is more preferable than the use of the locus length ΣS. This is because, compared with the locus length ΣS, the maximum value θmax of the rate θ of change is less subject to the influence caused by the external disturbance, such as change in the accelerator pedal depression amount, or the like. Therefore, because the maximum value θmax is used as data for determining the straight line that represents the tendency of change of the responsiveness parameter relative to change in the intake air amount of the engine 1, it becomes easier to obtain a proper straight line without receiving influence of the external disturbance.

Besides, the small-amount-of-intake-air region and the large-amount-of-intake-air region do not necessarily need to be apart from each other in the direction of change in the intake air amount of the engine 1, but the small-amount-of-intake-air region and the large-amount-of-intake-air region may also be adjacent to each other. In this case, the predetermined value X1$a$ and the predetermined value X1$b$ are equal to each other, and the predetermined value X2$a$ and the predetermined value X2$b$ are also equal to each other.

Besides, the small-amount-of-intake-air region does not necessarily need to be a region in which the intake air amount is smallest in the entire region of the intake air amount of the engine 1, but may also be a region that is closer to the large intake air amount.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. An abnormality detection apparatus for an air/fuel ratio sensor that outputs a signal that corresponds to air/fuel ratio of an internal combustion engine based on oxygen concentration in exhaust gas of the internal combustion engine, comprising:

an air/fuel ratio control portion that performs an active air/fuel ratio control of periodically fluctuating the air/fuel ratio of the internal combustion engine between a rich state and a lean state;

a data acquisition portion that acquires, as data for detecting abnormality, a parameter that corresponds to responsiveness during change of output of the air/fuel ratio sensor between a rich peak and a lean peak during the active air/fuel ratio control performed by the air/fuel ratio control portion;

a straight line setting portion that sets a straight line that represents a tendency of change of the parameter relative to change in intake air amount of the internal combustion engine based on the data acquired by the data acquisition portion a plurality of times; and an abnormality determination portion that determines presence/absence of abnormality of the air/fuel ratio sensor based on comparison between an abnormality criterion value and a gradient of the straight line set by the straight line setting portion.

2. The abnormality detection apparatus according to claim 1, wherein the data is acquired in each of a small-amount-of-intake-air region and a large-amount-of-intake-air region of the internal combustion engine, the straight line that represents the tendency of change of the parameter relative to change in the intake air amount of the internal combustion engine is set based on the data acquired in the small-amount-of-intake-air region and the data acquired in the large-amount-of-intake-air region.

3. The abnormality detection apparatus according to claim 2, wherein the large-amount-of-intake-air region and the small-amount-of-intake-air region are apart from each other in a direction of change in the intake air amount of the internal combustion engine, and the large-amount-of-intake-air region is determined in a region where the intake air amount is largest in an entire region of the intake air amount of the internal combustion engine, and the small-amount-of-intake-air region is determined in a region where the intake air amount is smallest in the entire region of the intake air amount of the internal combustion engine.

4. The abnormality detection apparatus according to claim 3, wherein the data in the large-amount-of-intake-air region is acquired a plurality of times, and the data in the small-amount-of-intake-air region is acquired a plurality of times, and the straight line connecting a maximum value of the data acquired in the large-amount-of-intake-air region and a minimum value of the data acquired in the small-amount-of-intake-air region is determined as the straight line that represents the tendency of change of the parameter relative to change in the intake air amount of the internal combustion engine.

5. The abnormality detection apparatus according to claim 1, wherein:

the acquisition of the data includes acquisition performed regarding the change of the output of the air/fuel ratio sensor from the rich peak to the lean peak during the active air/fuel ratio control, and acquisition performed regarding the change of the output of the air/fuel ratio sensor from the lean peak to the rich peak during the active air/fuel ratio control, and the number of acquisitions of the data regarding the change from the rich peak to the lean peak and the number of acquisitions of the data regarding the change from the lean peak to the rich peak are separately counted; and the presence/absence of abnormality of the air/fuel ratio sensor is determined based on comparison between the abnormality criterion value and the gradient of the straight line determined by using the data acquired regarding the change of the output of the air/fuel ratio sensor from the rich peak to the lean peak during the active air/fuel ratio control, and is also determined based on comparison between the abnormality criterion value and the gradient of the straight line determined by using the data acquired regarding the change of the output of the air/fuel ratio sensor from the lean peak to the rich peak during the active air/fuel ratio control.

6. An abnormality detection method for an air/fuel ratio sensor that outputs a signal that corresponds to air/fuel ratio of an internal combustion engine based on oxygen concentration in exhaust gas of the internal combustion engine, comprising:

performing an active air/fuel ratio control of periodically fluctuating the air/fuel ratio of the internal combustion engine between a rich state and a lean state;

acquiring, as data for detecting abnormality, a parameter that corresponds to responsiveness during change of output of the air/fuel ratio sensor between a rich peak and a lean peak during the active air/fuel ratio control;

setting a straight line that represents a tendency of change of the parameter relative to change in intake air amount of the internal combustion engine based on the data acquired by a plurality of times; and determining presence/absence of abnormality of the air/fuel ratio sensor based on comparison between an abnormality criterion value and a gradient of the straight line.

* * * * *